F. H. ROYCE.
GEARING FOR TRANSMISSION OF ROTARY MOTION.
APPLICATION FILED JUNE 24, 1913.

1,088,241.

Patented Feb. 24, 1914.

WITNESSES

INVENTOR
F. H. Royce.
per Percy H. Moore
Attorney

UNITED STATES PATENT OFFICE.

FREDERICK HENRY ROYCE, OF DERBY, ENGLAND.

GEARING FOR TRANSMISSION OF ROTARY MOTION.

1,088,241.  Specification of Letters Patent.  Patented Feb. 24, 1914.

Application filed June 24, 1913. Serial No. 775,498.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in and Relating to Gearing for the Transmission of Rotary Motion, of which the following is a specification, reference being had therein to the accompanying drawing.

This invention relates to gearing for the transmission of rotary motion, and has for its object the elimination of certain forms of irregular angular velocity or torque in the driven element of such gearing.

According to the present invention, a spring or elastic buffer drive and a spring-controlled frictional damper are both interposed between the driving and driven elements of the gearing, the construction and arrangement of said devices being such that the spring or elastic buffer drive is strong enough to transmit the whole of the rotary motion, the spring-controlled frictional damper being insufficient to transmit said rotary motion, and that the two devices function independently, that is to say, each performs the function it is designed to perform independently of the other.

In the transmission of rotary motion from prime movers, rotary vibrations are frequently set up in the transmission shafts or parts when such shafts or parts have a natural elasticity in a rotary direction. These vibrations arise from the variations in angular velocity or torque which occur during each revolution and are found more particularly when the driven part includes a member of appreciable inertia. For the purpose of eliminating or diminishing these variations in angular velocity or torque, a spring or elastic buffer drive has sometimes been employed, but in many cases the effect of this is that the relative rotary movement which consequently occurs between the driving and driven members of the transmission system develops into objectionable periodic or synchronous rotary vibrations. By the present invention the transference of irregularities in angular velocity or torque between said members is completely or partially prevented, and any slight remaining irregularities of angular velocity or torque are prevented from developing into periodic or synchronous rotary vibrations.

Figure 1:
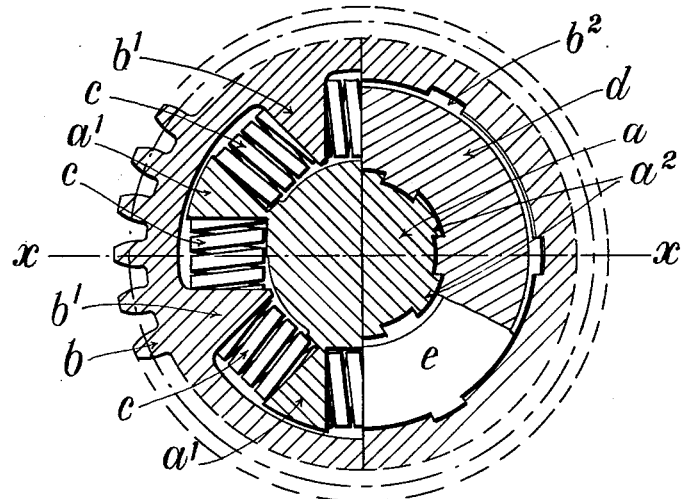
Figure 2:
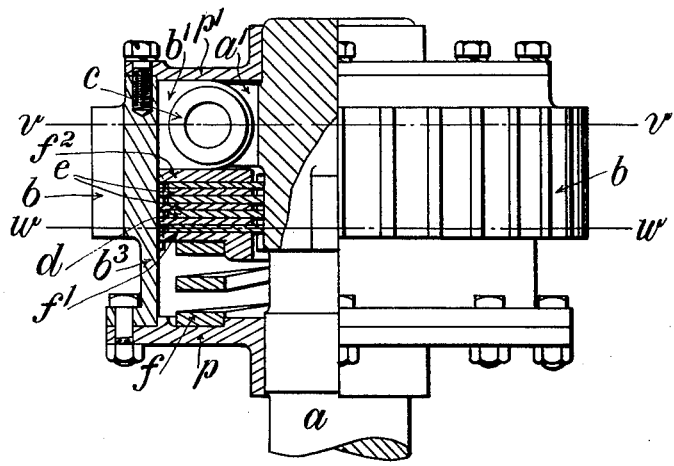

In the accompanying drawing, which illustrates this invention:—Figure 1 is a section taken in two different planes, the right hand half thereof being taken on the line $w$—$w$ of Fig. 2, and the left hand half being taken on the line $v$—$v$. Fig. 2 is a view partly in elevation and part in section the left hand half thereof being a section on the line $x$—$x$ of Fig. 1.

Throughout the views similar parts are marked with like letters of reference.

The shaft $a$ has four outwardly projecting radial lugs $a^1$ which are preferably equally spaced. The gear wheel $b$ from or to which is transmitted the rotary movement of the shaft $a$ has its boss $b^3$ made of annular box-like form and has its ends closed by plates $p$ and $p^1$. This boss carries within it four lugs $b^1$ which project inwardly and alternate with the lugs $a^1$. Interposed between the lugs $a^1$ and $b^1$ are spring or elastic buffers $c$ which are stiff enough to transmit the whole of the drive. Mounted on the shaft $a$ by means of castellations $a^2$ formed on its external circumference are a series of friction disks $d$, and mounted in a similar manner on castellations $b^2$ formed on the internal circumference of the boss $b^3$ of the wheel $b$ are a series of friction disks $e$ which alternate with the disks $d$. These friction disks are kept in contact with one another by means of a spring $f$ which operates between a specially shaped end friction disk $f^1$ and the end cover plate $p$. The strength of the spring $f$ is considerably less than that of the elastic or buffer drive so that it does not transmit any part of the drive and allows the device to function purely as a vibration damper. The other end friction disk $f^2$ is suitably strengthened and contacts one side of the lugs $b^1$ and the other cover plate $p^1$ contacts the other side of the lugs $b^1$. The lugs $a^1$ are made slightly narrower than the lugs $b^1$ so that they are free to move in a rotary direction independent of the gear wheel $b$ and its box-like boss.

The mechanism is operative in either direction, that is to say, the rotary motion can be transmitted from the shaft $a$ to the gear wheel $b$ or vice versa, the drive being taken through the lugs $a^1$ and $b^1$ and through the spring or elastic buffers $c$, the said spring or elastic buffers allowing the driven member to move relatively to the driving member in a rotary direction about its axis within certain limits, but these relative rotary movements of the driven member are prevented from developing into objectionable rotary vibrations by means of the damping action of the friction disks *d* and *e*.

What I claim as my invention, and desire to secure by Letters Patent is:—

1. In gearing for transmitting rotary motion from one element to another, the combination of a spring or elastic buffer drive and a spring-controlled frictional damper both interposed between the driving and driven elements of the said gearing and capable of functioning independently of one another.

2. In a gearing for transmitting rotary motion, the combination of a driving member having a series of radially arranged lugs or projections, a driven member having a series of radially arranged lugs or projections arranged to alternate with the lugs or projections carried by the driving member, springs or elastic buffers located and acting between the said two series of lugs or projections, two series of alternately arranged friction disks connected respectively to the driving and driven member, and spring-controlled means for creating and preserving frictional contact between said disks.

3. In a gearing for transmitting rotary motion, the combination of a transmitting member, an annular member carried by said transmitting member, a series of inwardly projecting lugs carried by said annular member, a second transmitting member, a series of outwardly projecting lugs carried by said second transmitting member, spring or elastic buffers interposed between the said two series of lugs, a series of friction disks carried by each of the transmitting members, those carried by one alternating with those carried by the other, and a spring operating to keep the two series of disks in frictional contact, as and for the purpose set forth.

In testimony whereof I have signed my name in the presence of two subscribing witnesses.

FREDERICK HENRY ROYCE.

Witnesses:
ALAN BRODRICK,
P. C. ELLIOTT.